United States Patent
Lin

(10) Patent No.: US 7,978,487 B2
(45) Date of Patent: Jul. 12, 2011

(54) SWITCHING POWER SUPPLY AND OVER-TEMPERATURE PROTECTION METHOD

(75) Inventor: Chien-Liang Lin, Hsin-Chu (TW)

(73) Assignee: Leadtrend Technology Corp., Science Based Industrial Park, Hsin-Chu (TW)

( * ) Notice: Subject to any disclaimer, the term of this patent is extended or adjusted under 35 U.S.C. 154(b) by 95 days.

(21) Appl. No.: 12/484,253

(22) Filed: Jun. 15, 2009

(65) Prior Publication Data

US 2010/0315846 A1 Dec. 16, 2010

(51) Int. Cl.
*H02H 7/122* (2006.01)

(52) U.S. Cl. ........... 363/55; 363/56.09; 363/74; 363/80; 363/97; 323/370

(58) Field of Classification Search ............... 363/56.09, 363/50, 55, 74, 80, 97, 131; 361/93.8; 323/352, 323/370

See application file for complete search history.

(56) References Cited

U.S. PATENT DOCUMENTS

| | | | | |
|---|---|---|---|---|
| 3,617,696 A | * | 11/1971 | Reenstra et al. | 219/243 |
| 4,402,298 A | * | 9/1983 | Morita | 123/406.56 |
| 5,274,208 A | * | 12/1993 | Noda | 219/715 |
| 6,597,588 B2 | * | 7/2003 | Matsumoto | 363/21.08 |

* cited by examiner

*Primary Examiner* — Shawn Riley
(74) *Attorney, Agent, or Firm* — Winston Hsu; Scott Margo

(57) ABSTRACT

A switching power supply includes an energy-storing device, a power switch, a driving circuit and a thermal sensing device. The energy-storing device is coupled to an input power source and controlled by the power switch to increase or decrease the power therein. The power switch has a control terminal connected to the driving circuit for switching. The thermal sensing device is connected to the control terminal of the power switch and powered by the driving circuit. When sensing an operation temperature exceeding a predetermined range, the thermal sensing device disables the driving circuit.

13 Claims, 5 Drawing Sheets

SWITCHING POWER SUPPLY AND OVER-TEMPERATURE PROTECTION METHOD

BACKGROUND OF THE INVENTION

1. Field of the Invention

The present invention relates to an over-temperature protection method and apparatus thereof for a switching power supply.

2. Description of the Prior Art

At present, most consumer electronic devices adopt switching power supplies as power supplies. The switching power supply controls the energy storage and release of an inductor via switching a power switch to provide a power supply fulfilling specification requirements. In order to prevent damage to equipments and risk to public security, most switching power supplies are equipped with various protection mechanisms, e.g., over-voltage protection (OVP), over-current protection (OCP), over-load protection (OLP), over-temperature protection (OTP), etc. to prevent the occurrence of the aforementioned damage or risk.

An OTP mechanism usually adopts a thermistor whose resistance varies with temperature to observe the temperature variation of a monitored object. When the temperature of the monitored object exceeds a permitted range, at least part of the operation of the switching power supply will be stopped.

FIG. 1 is a diagram of a switching power supply 60 adopting conventional OTP. Switching power supply 60 is a flyback power converter which converts energy inputted by the AC (alternating current) power source $V_{AC}$ into an output power source $V_{OUT}$ which meets a requirement of a specification. Bridge rectifier 62 substantially rectifies the AC power source $V_{AC}$. Power switch 72 controls a current in primary coil $L_P$ in transformer 64. When power switch 64 is turned on, the energy stored in transformer 64 is increased; when power switch 64 is turned off, the energy stored in transformer 64 is released via second coil $L_S$. The released energy is stored in output capacitor 69 through rectifier 66 and therefore generates the output power source $V_{OUT}$. Feedback circuit 68 monitors a magnitude (e.g., a current, a voltage, or a power) of the output power source $V_{OUT}$ and provides a feedback signal to controller 74.

An OTP mechanism is provided by resistor 78 and thermistor 76, which are connected between an input power source $V_{in}$ and an electrical ground GND. For example, assuming the resistance of thermistor 76 inversely proportional to the temperature, when thermistor 76 has a higher resistance at a lower temperature, controller 74 receives a logic "0" signal from enable pin "enb" and is thereby enabled. Switching power supply 60 normally provides the output power source $V_{OUT}$. Once the temperature of thermistor 76 exceeds a certain extent and the resistance thereof becomes smaller, controller 74 receives a logic "1" signal from enable pin "enb", thereby stopping switching of the power switch 72.

SUMMARY OF THE INVENTION

In one embodiment of the present invention, a switching power supply is disclosed. The switching power supply includes an energy-storing device, a power switch, a driving circuit and a thermal sensing device. The energy-storing device is coupled to an input power source. The power switch controls the energy-storing device to increase or decrease an electric power within the energy-storing device, and has a control terminal. The driving circuit, coupled to the control terminal of the power switch, is implemented for switching the power switch. The thermal sensing device, coupled to the control terminal of the power switch, is powered by the driving circuit. When sensing that an ambient temperature exceeds a predetermined range, the thermal sensing device disables the driving circuit.

In another embodiment of the present invention, over-temperature protection method is provided. The over-temperature protection method includes: providing an integrating circuit chip which comprises a driving circuit for driving one terminal of a power switch, wherein the integrated circuit chip further comprises a pin and a detecting circuit; coupling a thermal sensing device to the control terminal and the pin; detecting a characteristic of the pin when the power switch is turned on; and disabling the driving circuit when the characteristic of the pin exceeds a predetermined range.

These and other objectives of the present invention will no doubt become obvious to those of ordinary skill in the art after reading the following detailed description of the preferred embodiment that is illustrated in the various figures and drawings.

DETAILED DESCRIPTION

To facilitate a further comprehension of objectives, characteristics and advantages of the present invention, the following paragraphs bring out preferred embodiments in conjunction with accompanying drawings for detailed explanation.

For ease of explanation, same or similar functions will be represented by the same element symbol. Therefore, the same symbols in different embodiments do not necessarily mean that two elements are completely the same. The scope of the present invention is dependent on the limitations recited in the claims.

Figure 1:
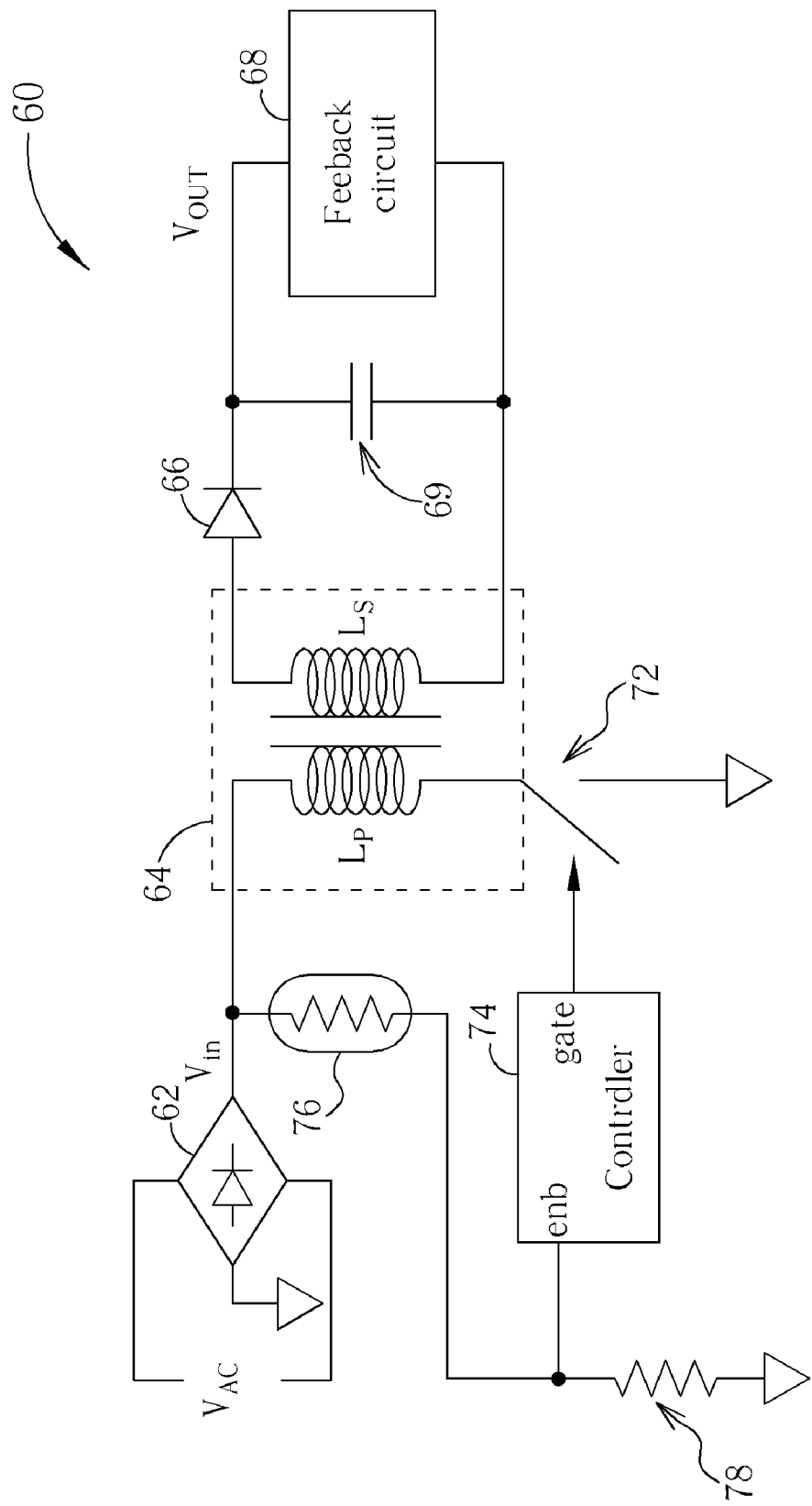
FIG. 1 is a diagram of a switching power supply adopting conventional over-temperature protection.
Figure 2:
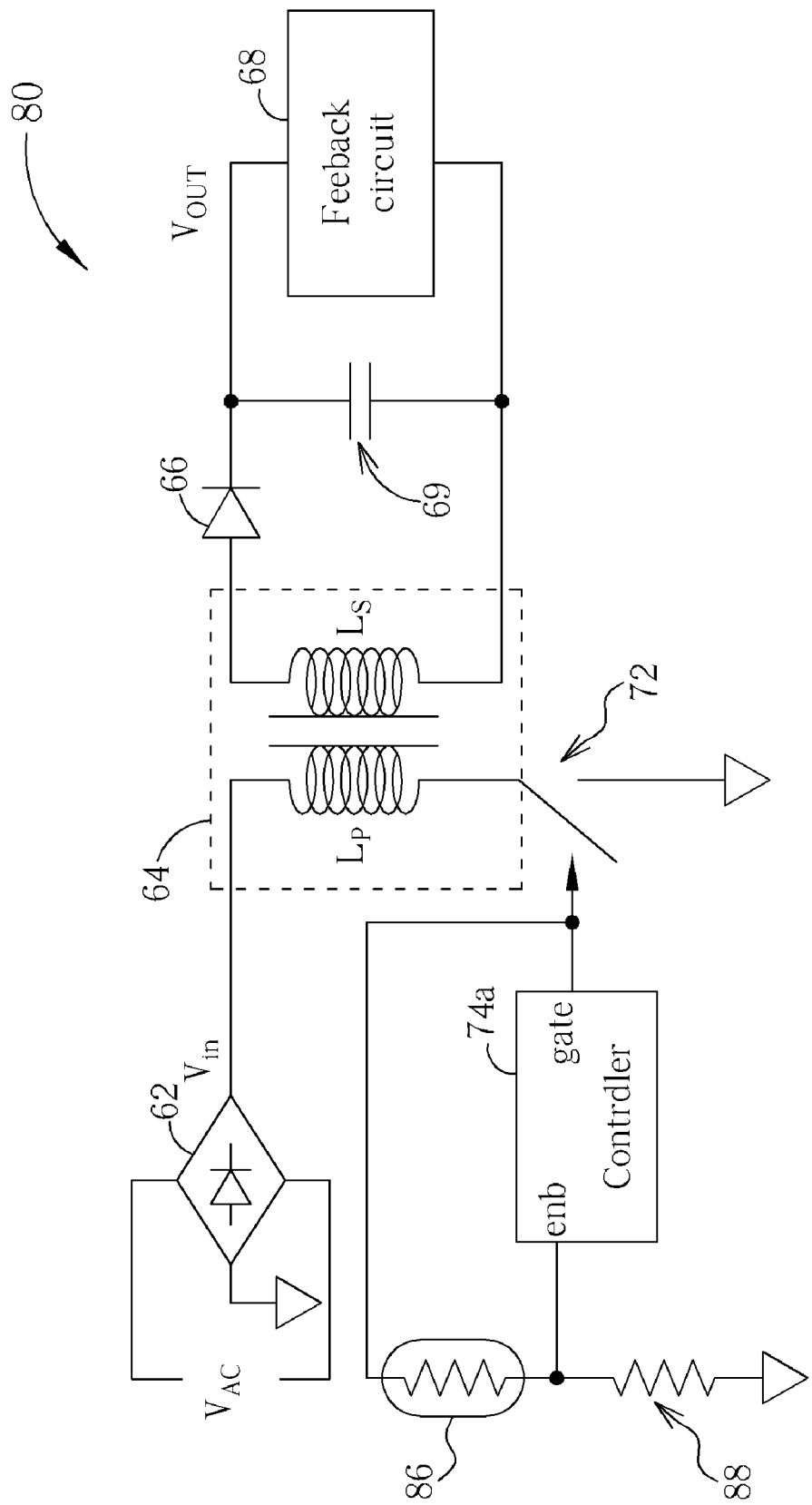
FIG. 2 is a diagram of a switching power supply according to an embodiment of the present invention.

FIG. 2 is a diagram of a switching power supply 80 according to an embodiment of the present invention. Switching power supply 80 is a flyback power converter converting energy inputted by the AC power source $V_{AC}$ into an output power source $V_{OUT}$. All the same or similar elements represented by the same symbol in FIG. 1 and FIG. 2 are explained in the prior art, and therefore further description will be omitted here for brevity. Unlike the conventional configuration shown in FIG. 1, thermistor 86 and resistor 88 in this embodiment are connected in series between the control terminal of power switch 72 and the electrical ground GND; the connecting point between thermistor 86 and resistor 88 is connected to pin "enb" of controller 74a. When controller 74a turns off power switch 72 with a low voltage, thermistor 86 is not powered; when controller 74a turns on power switch 72 with a high voltage, thermistor 86 is powered and thereby a divided voltage is generated at pin "enb".

Thermistor 86 could be an NTC (negative temperature coefficient) resistor whose resistance falls when an ambient temperature rises. Controller 74a could be an integrated circuit chip.

Figure 3:
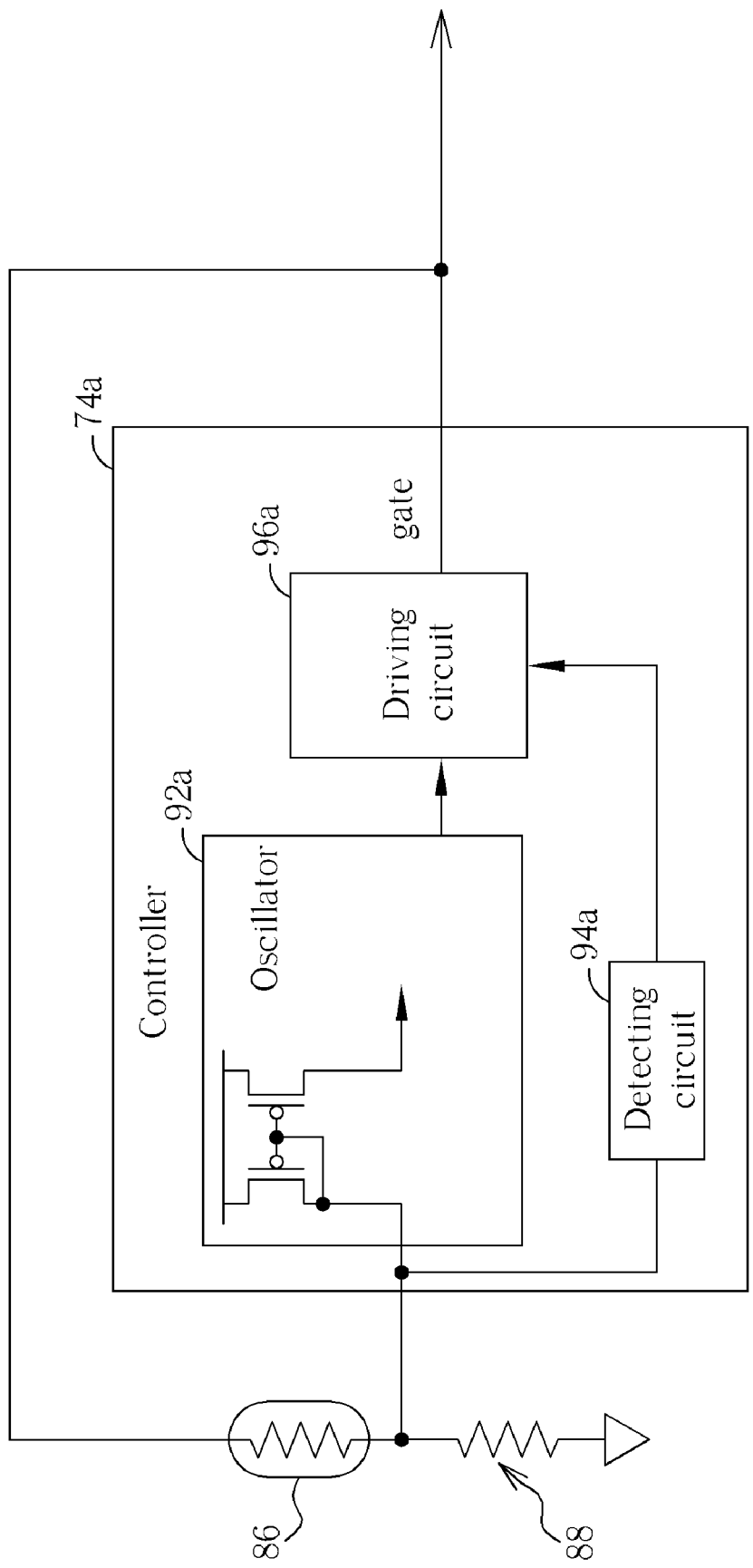
FIG. 3 is a zoom-in diagram of partial circuits in FIG. 2.

FIG. 3 is a zoom-in diagram of partial circuits shown in FIG. 2. In FIG. 3, controller 74a includes a driving circuit 96a, an oscillator 92a and a detecting circuit 94a. Driving circuit 96a is connected to thermistor 86 via a pin "gate". Oscillator 92a is connected to resistor 88 and thermistor 86 via pin "enb". Detecting circuit 94a detects a current flowing through pin "enb".

When the ambient temperature is within a predetermined permitted range, the resistance of thermistor 86 is so large that it could be viewed as open-circuited. Therefore, the driving signal, no matter whether a high voltage or a low voltage, provided by driving circuit 96a to power switch 72 can be viewed as non-influential to resistor 88. Resistor 88 determines a charging/discharging current of oscillator 92a so as to determine the oscillating frequency for providing a clock signal to driving circuit 96a. At this time, detecting circuit 94a determines that the current flowing through pin "enb" is a proper value and thus enables driving circuit 96a to periodically control power switch 72.

When the ambient temperature is higher than a predetermined permitted range, the resistance of thermistor 86 becomes relatively small. When driving circuit 96a provides a high voltage to turn on power switch 72, the voltage at pin "enb" becomes higher, leading to a relatively smaller current flowing through pin "enb". When the current flowing through pin "enb" becomes smaller than a predetermined value, detecting circuit 94a determines that an over-temperature event occurs, thus disabling the driving circuit 96a to stop driving circuit 96a from switching power switch 72. Detecting circuit 94a can be designed to acquire a latching function. Once an over-temperature event occurs, the output will be latched and will not be released even after driving circuit 96a turning off the power switch 72.

Detecting circuit 94a could also be designed to detect a voltage at pin "enb". When the voltage of pin "enb" is higher than a predetermined value, an occurrence of the over-temperature event is detected.

In the embodiment of FIG. 3, pin "enb" is a multi-function pin, which not only has a function of over-temperature protection, but also has a function of setting the charging/discharging current in oscillator 92a.

Thermistor 76 within the conventional switching power supply 60 in FIG. 1 is powered by an input power source $V_{in}$. Input power source $V_{in}$ may offer hundreds of volts continuously. Thus, a conducting path constructed by thermistor 76 and resistor 78 could consume a considerable amount of electric power.

Thermistor 86 within switching power supply 80 shown in FIG. 2 and FIG. 3 is powered by driving circuit 96a. On one hand, the high driving voltage provided by driving circuit 96a may be only tens of volts, and the amount of power consumed by the path formed by thermistor 86 and resistor 88 is relatively small; on the other hand, the high driving voltage provided by driving circuit 96a only exists when power switch 72 is turned on. When power switch 72 is turned off, thermistor 86 and resistor 88 almost consume no power at all. Therefore, compared with the prior art in FIG. 1, switching power supply 80 in FIG. 2 can save a great deal of electric power.

Figure 4:
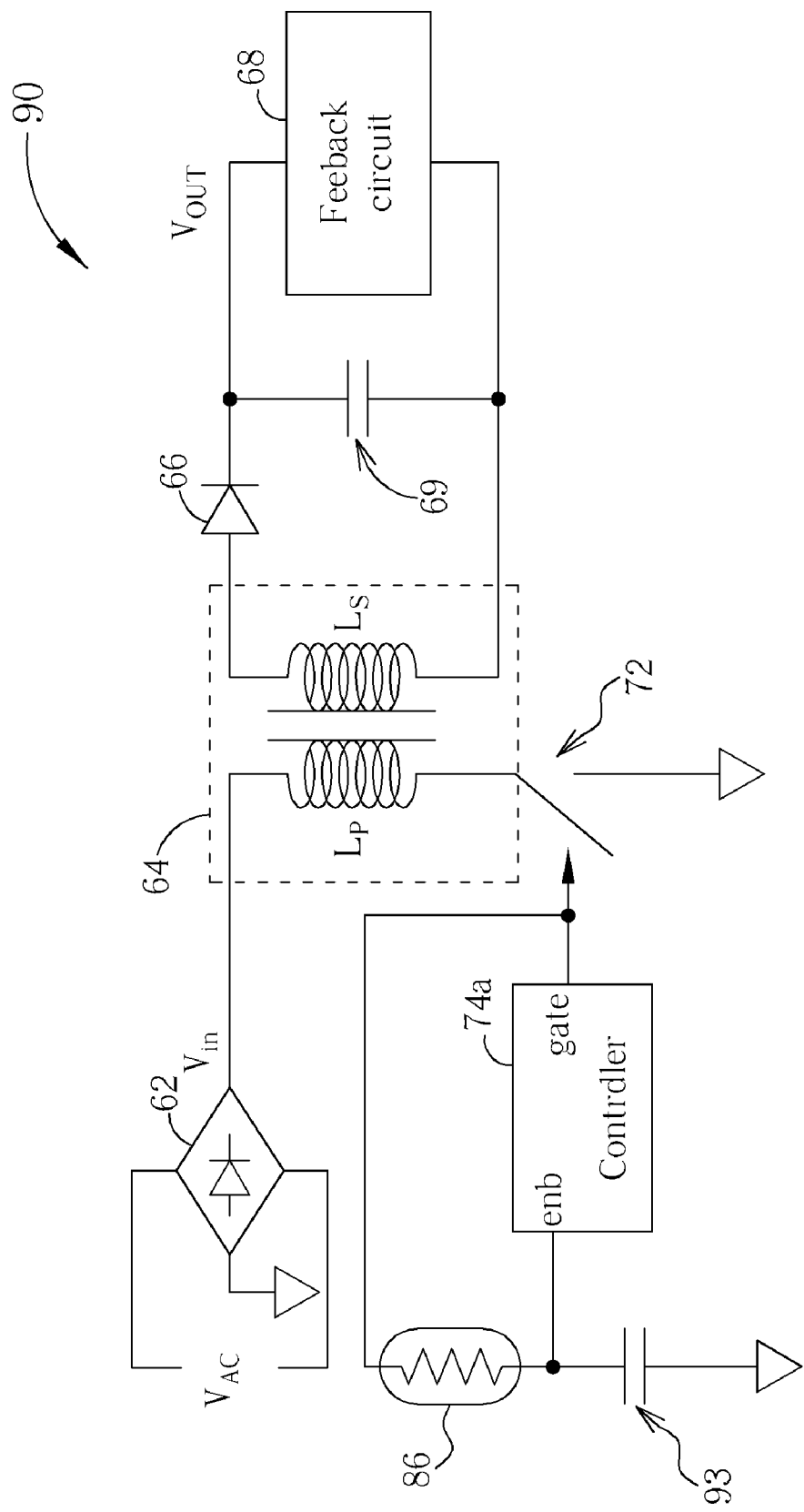
FIG. 4 is a diagram of a switching power supply according to another embodiment of the present invention.

FIG. 4 is a diagram of a switching power supply 90 according to an embodiment of the present invention. Switching power supply 90 is a flyback power converter which converts energy inputted by AC power source $V_{AC}$ into output power source $V_{OUT}$ which meets specification requirements. Same or similar elements represented by the same symbol in FIG. 2 and FIG. 4 are explained above, and therefore further description will be omitted here for brevity. Resistor 88 in FIG. 2 is replaced by a capacitor 93 in FIG. 4. When controller 74b turns off the power switch 72 with a low voltage, thermistor 86 is not powered; when controller 74b turns on power switch 72 with a high voltage, thermistor 86 is powered to change a voltage of pin "enb". Controller 74b could be an integrated circuit chip.

Figure 5:
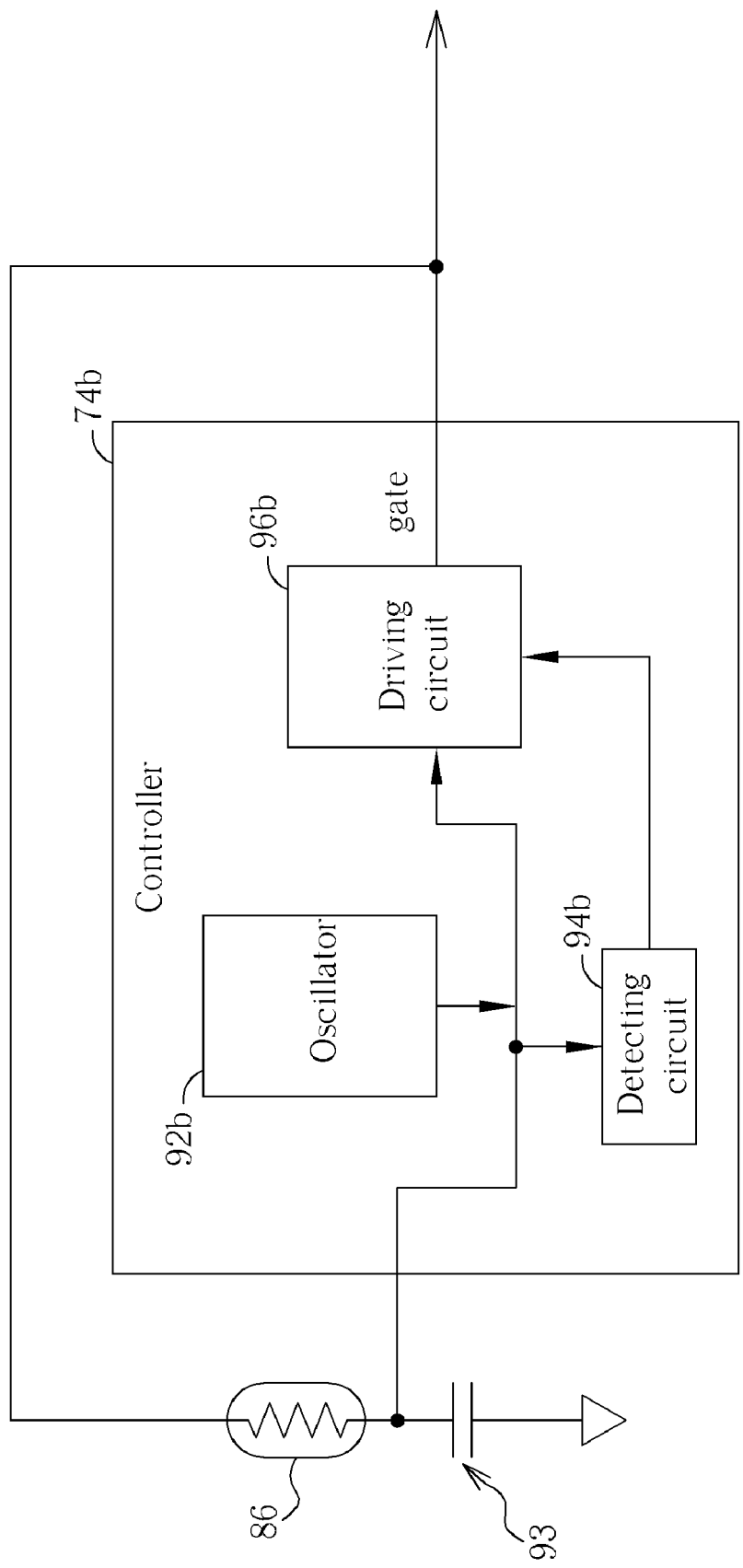
FIG. 5 is a zoom-in diagram of partial circuits in FIG. 4.

FIG. 5 is a zoom-in diagram of partial circuits shown in FIG. 4. In FIG. 5, controller 74b includes a driving circuit 96b, an oscillator 92b and a detecting circuit 94b. Driving circuit 96b is connected to thermistor 86 via pin "gate". Oscillator 92b is connected to capacitor 93 and thermistor 86 via pin "enb". Detecting circuit 94b detects a current flowing through pin "enb".

When the ambient temperature is within a predetermined permitted range, the resistance of thermistor 86 is so large that it could be viewed as open-circuited. Therefore, the driving signal, no matter whether a high voltage or a low voltage, provided by driving circuit 96b to power switch 72 could be viewed as non-influential to capacitor 93. Capacitor 93 is charged/discharged by a charging/discharging current of oscillator 92b so as to determine the oscillating frequency. In this way, a triangular wave is generated at one terminal of capacitor 93 and provided to driving circuit 96b. At this time, detecting circuit 94b determines that the voltage at pin "enb" is within a proper range and thus enables driving circuit 96b to periodically control power switch 72.

When the ambient temperature is higher than a predetermined permitted range, the resistance of thermistor 86 becomes relatively small. When driving circuit 96b provides a high voltage to turn on power switch 72, the voltage at pin "enb" becomes high. At this moment, detecting circuit 94b determines that an over-temperature event occurs according to the voltage at pin "enb", and thereby disabling and stopping driving circuit 96b from switching power switch 72. Detecting circuit 94b can be designed to acquire a latching function. Once an over-temperature event occurs, the output will be latched and will not be released even the driving circuit 96b turning off power switch 72.

Similarly, thermistor 86 within switching power supply 90 in FIG. 4 and FIG. 5 is powered by driving circuit 96b. On one hand, the high driving voltage provided by driving circuit 96b is relatively lower; on the other hand, the high driving voltage from driving circuit 96b is not continuously provided. Therefore, compared with the prior art design in FIG. 1, switching power supply 90 in FIG. 4 can save a great deal of electric power.

Those skilled in the art will readily observe that numerous modifications and alterations of the device and method may be made while retaining the teachings of the invention.

What is claimed is:

1. A switching power supply, comprising:
   an energy-storing device, coupled to an input power source;
   a power switch with a control terminal, for controlling the energy-storing device to increase or decrease electric power within the energy-storing device;
   a driving circuit, coupled to the control terminal of the power switch, for switching the power switch; and
   a thermal sensing device, coupled to the control terminal of the power switch and powered by the driving circuit;
   wherein the thermal sensing device disables the driving circuit when sensing that an ambient temperature exceeds a predetermined range, the driving circuit is placed in an integrated circuit chip which comprises an oscillator and a pin, the oscillator provides a periodic signal to the driving circuit, the switching power supply further comprises a resistor coupled to the oscillator via the pin of the integrated circuit chip, and the thermal sensing device is coupled between the resistor and the control terminal of the power switch.

2. The switching power supply of claim 1, wherein a current flowing through the resistor substantially determines a frequency of the oscillator.

3. The switching power supply of claim 1, further comprising a detecting circuit, wherein the detecting circuit and the driving circuit are placed in an integrated circuit chip, the detecting circuit is coupled to the thermal sensing device via a pin, and the detecting circuit controls the driving circuit via a voltage of the pin.

4. The switching power supply of claim 1, further comprising a detecting circuit, wherein the detecting circuit and the driving circuit are placed in an integrated circuit chip, the detecting circuit is coupled to the thermal sensing device via a pin, and the detecting circuit controls the driving circuit via a current flowing through the pin.

5. An over-temperature protection method, comprising:
    providing an integrating circuit chip comprising a driving circuit for driving one terminal of a power switch, wherein the integrated circuit chip further comprises a pin and a detecting circuit;
    coupling a thermal sensing device to the control terminal and the pin;
    detecting a characteristic of the pin when a power switch is turned on; and
    disabling the driving circuit when the characteristic of the pin exceeds a predetermined range.

6. The over-temperature protection method of claim 5, wherein the characteristic is a voltage of the pin.

7. The over-temperature protection method of claim 5, wherein the characteristic is a current flowing through the pin.

8. The over-temperature protection method of claim 5, wherein the integrated circuit chip further comprises an oscillator, and the over-temperature protection method further comprises:
    coupling a resistor to the pin for determining a charging/discharging current of the oscillator.

9. The over-temperature protection method of claim 5, wherein the integrated circuit chip further comprises an oscillator, and the over temperature protection method further comprises:
    coupling a capacitor to the pin for serving as a charged/discharged capacitor utilized by the oscillator, thereby providing a triangular wave signal at one terminal of the capacitor.

10. A switching power supply, comprising:
    an energy-storing device, coupled to an input power source;
    a power switch with a control terminal, for controlling the energy-storing device to increase or decrease electric power within the energy-storing device;
    a driving circuit, coupled to the control terminal of the power switch, for switching the power switch; and
    a thermal sensing device, coupled to the control terminal of the power switch and powered by the driving circuit;
    wherein the thermal sensing device disables the driving circuit when sensing that an ambient temperature exceeds a predetermined range, the driving circuit is placed in an integrated circuit chip which comprises an oscillator and a pin, the oscillator provides a periodic signal to the driving circuit, the switching power supply further comprises a capacitor coupled to the oscillator via the pin of the integrated circuit chip, and the thermal sensing device is coupled between the capacitor and the control terminal of the power switch.

11. The switching power supply of claim 10, wherein one terminal of the capacitor is capable of providing a triangular wave.

12. A switching power supply, comprising:
    an energy-storing device, coupled to an input power source;
    a power switch with a control terminal, for controlling the energy-storing device to increase or decrease electric power within the energy-storing device;
    a driving circuit, coupled to the control terminal of the power switch, for switching the power switch;
    a thermal sensing device, coupled to the control terminal of the power switch and powered by the driving circuit; and
    a detecting circuit;
    wherein the thermal sensing device disables the driving circuit when sensing that an ambient temperature exceeds a predetermined range, the detecting circuit and the driving circuit are placed in an integrated circuit chip, the detecting circuit is coupled to the thermal sensing device via a pin, and the detecting circuit controls the driving circuit via a voltage of the pin.

13. A switching power supply, comprising:
    an energy-storing device, coupled to an input power source;
    a power switch with a control terminal, for controlling the energy-storing device to increase or decrease electric power within the energy-storing device;
    a driving circuit, coupled to the control terminal of the power switch, for switching the power switch;
    a thermal sensing device, coupled to the control terminal of the power switch and powered by the driving circuit; and
    a detecting circuit;
    wherein the thermal sensing device disables the driving circuit when sensing that an ambient temperature exceeds a predetermined range, the detecting circuit and the driving circuit are placed in an integrated circuit chip, the detecting circuit is coupled to the thermal sensing device via a pin, and the detecting circuit controls the driving circuit via a current flowing through the pin.

* * * * *